United States Patent
Cassagne et al.

(10) Patent No.: US 9,593,708 B2
(45) Date of Patent: Mar. 14, 2017

(54) ASSEMBLY COMPRISING AN ARTICULATION SPINDLE SUPPORTED BY A CLEVIS AND IMMOBILIZED IN TRANSLATION BY A BLOCKING DEVICE INTEGRATING A DOUBLE ANTI-ROTATION SYSTEM

(71) Applicant: Airbus Operations (SAS), Toulouse (FR)

(72) Inventors: Jerome Cassagne, Toulouse (FR); Thomas Deforet, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 133 days.

(21) Appl. No.: 14/553,432

(22) Filed: Nov. 25, 2014

(65) Prior Publication Data
US 2015/0167726 A1    Jun. 18, 2015

(30) Foreign Application Priority Data
Dec. 12, 2013   (FR) ...................................... 13 62478

(51) Int. Cl.
*F16B 39/24*     (2006.01)
*B64D 27/26*     (2006.01)
(Continued)

(52) U.S. Cl.
CPC .............. *F16B 39/24* (2013.01); *B64D 27/26* (2013.01); *F16B 39/108* (2013.01); *F16C 11/04* (2013.01);
(Continued)

(58) Field of Classification Search
CPC ............. B64D 27/26; Y10T 403/32861; Y10T 403/32868; Y10T 403/32893;
(Continued)

(56) References Cited

U.S. PATENT DOCUMENTS 3,503,431 A * 3/1970 Whiteside ............... F16B 41/00
411/353
3,638,980 A * 2/1972 Kleinhenn ............... F16B 39/08
411/320
(Continued)

FOREIGN PATENT DOCUMENTS

EP         0357504       3/1990
FR         2074454      10/1971
(Continued)

OTHER PUBLICATIONS

French Search Report, Aug. 27, 2014.
French Search Report, dated Aug. 26, 2014, for application corresponding to US20150166189.

*Primary Examiner* — Joshua J Michener
*Assistant Examiner* — Matthew Gitlin
(74) *Attorney, Agent, or Firm* — Greer, Burns & Crain, Ltd.

(57) ABSTRACT

An assembly with an articulation spindle mounted in a first sleeve inserted into a first arm of a clevis and in a second sleeve inserted into a second arm of said clevis. The assembly comprises a blocking device. The blocking device comprises a nut screwed onto a threaded portion of an extension of the second sleeve and comprising an inner shoulder against which the second end of the articulation spindle can come to bear, a locking washer able to adopt a locked state in which it prevents the nut from rotating with respect to the extension and an unlocked state in which it allows the nut to be unscrewed, and a longilinear element able to adopt a locked state in which it passes through at least the nut so as to prevent it from rotating.

18 Claims, 4 Drawing Sheets

(51) Int. Cl.
*F16B 39/10* (2006.01)
*F16C 11/04* (2006.01)
*F16B 39/04* (2006.01)

(52) U.S. Cl.
CPC ....... *F16B 39/04* (2013.01); *Y10T 403/32893* (2015.01)

(58) Field of Classification Search
CPC ..... Y10T 403/32909; Y10T 403/32918; F16B 39/24; F16B 39/108; F16B 39/04; F16C 11/04
USPC ....... 403/150, 151, 152, 153, 154, 155, 156, 403/157
See application file for complete search history.

(56) References Cited

U.S. PATENT DOCUMENTS

| | | | |
|---|---|---|---|
| 3,831,888 A | 8/1974 | Baker et al. | |
| 4,655,657 A * | 4/1987 | Duran | F16B 21/10 411/21 |
| 4,943,013 A * | 7/1990 | Kapala | B64D 27/26 244/54 |
| 5,176,339 A | 1/1993 | Schmidt | |
| 5,360,303 A * | 11/1994 | Behrens | F16B 39/08 411/120 |
| 5,782,430 A | 7/1998 | Mouille | |
| 6,330,995 B1 * | 12/2001 | Mangeiga | B64D 27/26 244/54 |
| 6,474,596 B1 | 11/2002 | Cousin et al. | |
| 6,669,393 B2 | 12/2003 | Schilling | |
| 6,843,449 B1 | 1/2005 | Manteiga et al. | |
| 7,325,770 B2 | 2/2008 | Chevalier et al. | |
| 7,891,604 B2 * | 2/2011 | Combes | B64D 27/26 244/54 |
| 7,950,604 B2 * | 5/2011 | Combes | B64D 27/26 244/54 |
| 8,322,651 B2 | 12/2012 | Levert et al. | |
| 8,348,191 B2 | 1/2013 | West | |
| 8,561,941 B2 * | 10/2013 | Combes | B64D 27/26 244/54 |
| 8,596,603 B2 * | 12/2013 | Gallet | F01D 25/162 244/53 R |
| 8,740,136 B2 * | 6/2014 | Audart-Noel | B64D 27/26 244/54 |
| 2006/0138295 A1 * | 6/2006 | Blateri | F04D 25/088 248/343 |
| 2008/0156930 A1 * | 7/2008 | Audart-Noel | B64D 27/26 244/54 |
| 2015/0166189 A1 | 6/2015 | Cassagne | |
| 2015/0166190 A1 * | 6/2015 | Cassagne | B64D 27/26 403/57 |
| 2015/0166191 A1 * | 6/2015 | Cassagne | B64D 27/26 244/54 |
| 2015/0167726 A1 * | 6/2015 | Cassagne | F16B 39/24 411/136 |

FOREIGN PATENT DOCUMENTS

| | | |
|---|---|---|
| FR | 2887853 | 1/2007 |
| GB | 186552 | 10/1922 |
| JP | S6014312 | 1/1985 |
| JP | S6289341 U | 6/1987 |

* cited by examiner

ASSEMBLY COMPRISING AN ARTICULATION SPINDLE SUPPORTED BY A CLEVIS AND IMMOBILIZED IN TRANSLATION BY A BLOCKING DEVICE INTEGRATING A DOUBLE ANTI-ROTATION SYSTEM

CROSS-REFERENCES TO RELATED APPLICATIONS

This application claims the benefit of the French patent application No. 1362478 filed on Dec. 12, 2013, the entire disclosures of which are incorporated herein by way of reference.

BACKGROUND OF THE INVENTION

The present invention relates to an assembly comprising an articulation spindle supported by a clevis and immobilized in translation by a blocking device integrating a double anti-rotation system.

Figure 1:
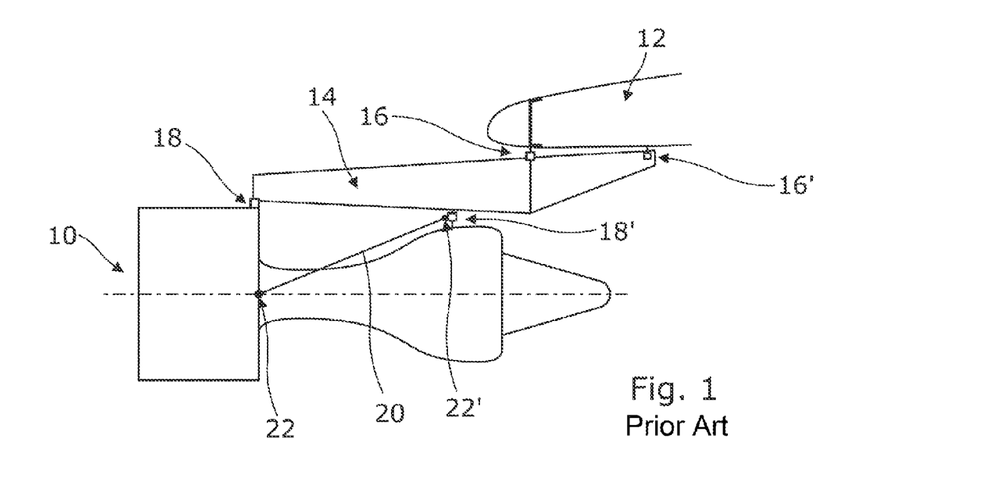
FIG. 1 is a schematic representation of a connection between an engine and a wing of an aircraft.

In the field of aeronautics, according to one configuration shown in FIG. 1, an engine 10 is connected to a wing 12 of an aircraft via the intermediary of an attachment pylon 14.

The attachment pylon 14 is connected to the wing 12 via the intermediary of fasteners 16, 16', at the front and at the rear of the attachment pylon. In parallel, the engine 10 is connected to the attachment pylon 14 via the intermediary of fasteners 18, 18', at the front and at the rear of the engine. The connection between the engine 10 and the attachment pylon 14 comprises lateral link rods 20 which take up the thrust forces generated by the engine 10, each lateral link rod 20 being connected at a first end by a fastener 22 to the engine 10 and at a second end by a fastener 22' to the attachment pylon 14.

Some of these fasteners 16, 16', 18, 18', 22, 22' comprise at least one assembly with an articulation spindle connecting a clevis and a ferrule.

Figure 2:
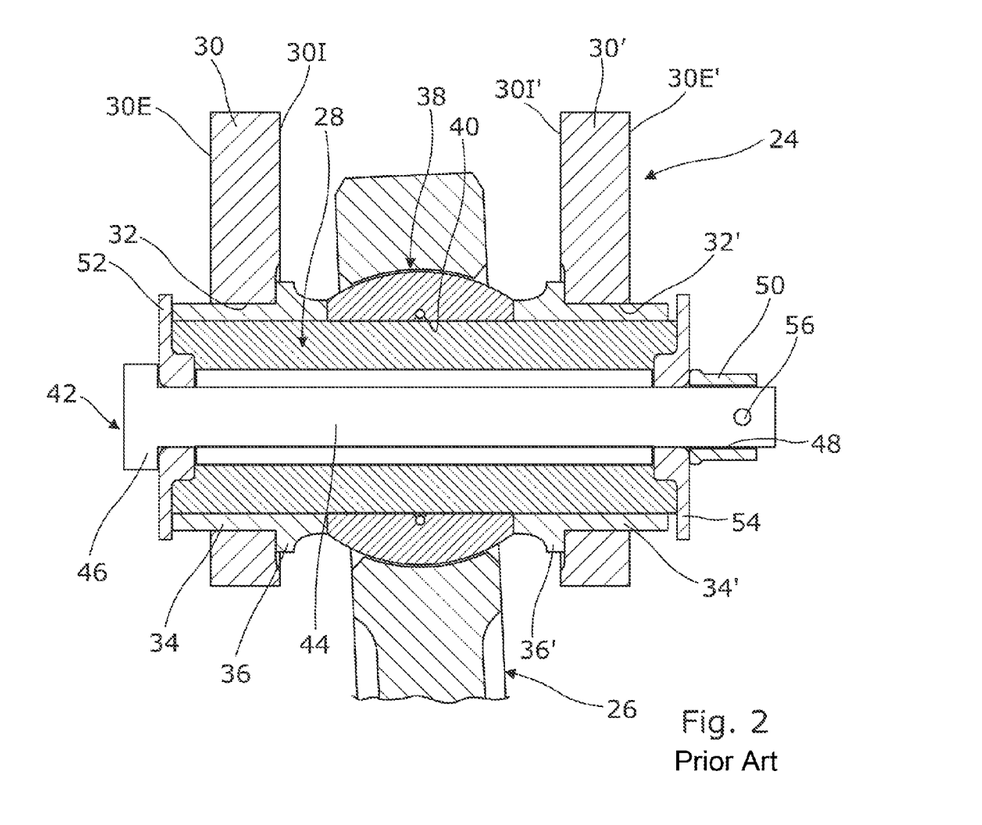
FIG. 2 is a section through an assembly having an articulation spindle which illustrates a first embodiment of the prior art.

One embodiment of an assembly provided at the fastener 18' connecting the engine 10 and the attachment pylon 14 at the rear of the engine is shown in FIG. 2.

This assembly comprises a clevis 24 connected to the attachment pylon 14, a ferrule 26 connected to the engine and an articulation spindle 28 connecting the clevis 24 and the ferrule 26.

The clevis 24 comprises two arms 30, 30', each comprising an inner face 30I, 30I' and an outer face 30E, 30E', wherein the inner faces 30I and 30I' face each other.

Each arm 30, 30' comprises a bore 32, 32' into which is inserted a sleeve 34, 34', the two sleeves 34, 34' being coaxial and aligned and having equal internal diameters.

In the following, the longitudinal direction corresponds to the direction of the axes of the sleeves 34, 34'.

Each sleeve 34, 34' comprises an outer shoulder 36, 36' which presses against the inner face 30I, 30I' of the arm into which it is inserted, so as to limit the movement in translation of said sleeves 34, 34' in the longitudinal direction.

The ferrule 26 comprises a swivel bearing 38 with a bore 40 whose diameter is substantially equal to the internal diameter of the sleeves 34, 34'.

The articulation spindle 28 comprises a hollow cylindrical body whose outer diameter is substantially equal to the internal diameter of the sleeves 34, 34' and the diameter of the bore 40 of the swivel bearing 38.

In order to avoid the articulation spindle 28 coming out of the sleeves and the fastener coming apart, the assembly comprises a blocking device for immobilizing the articulation spindle in translation in the longitudinal direction.

According to a first embodiment shown in FIG. 2, the blocking device comprises:
  a bolt 42 with a shank 44 housed in the articulation spindle 28, a head 46 at a first end of the shank and a threaded portion 48 at a second end of the shank,
  a self-locking nut 50 which is screwed onto the threaded portion 48 of the bolt 42,
  a first washer 52 which is interposed between the head 46 of the bolt and the articulation spindle 28 and whose outer diameter is greater than the outer diameter of the articulation spindle,
  a second washer 54 which is interposed between the nut 50 and the articulation spindle 28 and whose outer diameter is greater than the outer diameter of the articulation spindle,
  a pin 56 which passes through the nut 50 and the shank 44 of the bolt so as to immobilize the nut 50 with respect to the bolt 42.

According to this embodiment, the self-locking nut 50 corresponds to a first anti-rotation system and the pin 56 corresponds to a second anti-rotation system.

During assembly, the bolt 42 is introduced from a first end of the articulation spindle 28 whereas the nut 50 and the pin 56 are maneuvered from a second end of the articulation spindle. As a consequence, this first embodiment requires free space on both sides of the clevis 24.

Figure 3:
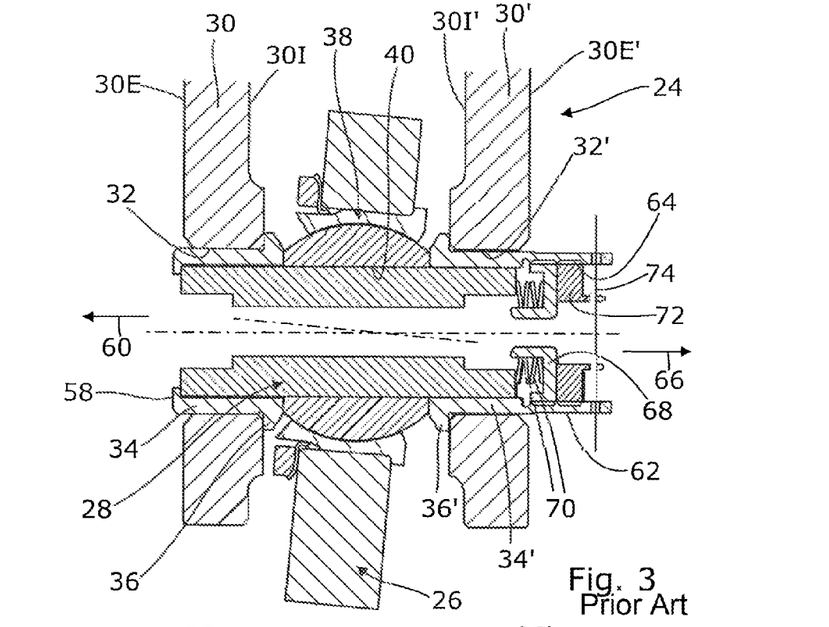
FIG. 3 is a section through an assembly having an articulation spindle which illustrates a second embodiment of the prior art.

In order to remedy this drawback, and to allow assembly from just one side of the clevis, a second embodiment shown in FIG. 3 has been developed.

This embodiment is more particularly suited to fasteners 18 located at the front of the engine 10.

Those elements which are in common with the first embodiment are referenced in the same manner.

According to this second embodiment, the sleeve 34 of the first arm 30 of the clevis 24 comprises at a first end an outer shoulder 36 which projects out from the sleeve and which bears against the inner face 30I of the first arm 30 and at a second end an inner shoulder 58 which projects into the sleeve and which acts as a stop against which a first end of the articulation spindle 28 can come to bear in order to limit the movement thereof in translation in the longitudinal direction in a first sense indicated by the arrow 60 in FIG. 3.

The sleeve 34' of the second arm 30' of the clevis 24 comprises at a first end an outer shoulder 36 which projects out from the sleeve and which bears against the inner face 30I' of the second arm 30' and at a second end an extension 62 which extends beyond the outer face 30E' of the second arm 30' and which comprises a tapped bore 64 whose diameter is greater than the internal diameter of the sleeve 34'.

According to this second embodiment, a blocking device makes it possible to limit the movement in translation of the articulation spindle 28 in the longitudinal direction in a second sense indicated by the arrow 66 in FIG. 3. The blocking device comprises:
  a first headless screw 68 which is screwed into the tapped bore 64,
  at least one elastic washer 70 interposed between the second end of the articulation spindle 28 and the first headless screw 68,
  a second headless screw 72 which is screwed into the tapped bore 64 and presses against the other side of the first headless screw 68 from the elastic washer(s) 70, a flexible or rigid longilinear element 74 which passes through the extension 62 and the second headless screw 72 so as to immobilize said second headless screw 72 in rotation with respect to the extension 62.

The longilinear element 74 corresponds to a first anti-rotation system and mounting the first headless screw 68 between at least one elastic washer 70 and a second headless screw 72 corresponds to a second anti-rotation system.

This second embodiment has the advantage that it is possible to carry out the assembly from just one side of the clevis.

However, installing the headless screws 68 and 72 inside the tapped bore 64 is not easy and requires the use of tools. This installation is even more difficult when the articulation spindles are of smaller diameter. Indeed, in this case, it is necessary to exert a relatively large torque given the small diameter of the headless screws in order to compress the elastic washer(s) and obtain the second anti-rotation system.

The present invention aims to remedy the drawbacks of the prior art.

SUMMARY OF THE INVENTION

To that end, the invention relates to an assembly with an articulation spindle mounted in a first sleeve inserted into a first arm of a clevis and in a second sleeve inserted into a second arm of said clevis.

The articulation spindle is immobilized in translation by an inner shoulder of the first sleeve which acts as a stop for a first end of said articulation spindle, and by a blocking device which acts as a stop for a second end of said articulation spindle.

According to the invention, the assembly is characterized in that the blocking device comprises:
- a nut which is screwed onto a threaded portion of an extension of the second sleeve and which comprises an inner shoulder which acts as a stop for the second end of the articulation spindle,
- a locking washer which is able to adopt a locked state in which it prevents the nut from rotating with respect to the extension and an unlocked state in which it allows the nut to be unscrewed,
- a longilinear element which is able to adopt a locked state in which the longilinear element passes through at least the nut and the articulation spindle so as to prevent the nut from rotating with respect to the articulation spindle and an unlocked state in which the longilinear element allows the nut to be unscrewed from the threaded portion of the extension.

According to this configuration, the nut is always accessible and has a large screwing diameter which facilitates its installation, contrary to a headless screw.

The locking washer preferably comprises a circumference comprising shapes which are complementary with those of the nut, the complementary shapes preventing the nut from rotating with respect to the extension in a first position corresponding to the locked state of the locking washer, and allowing the nut to rotate with respect to the extension in a second position, corresponding to the unlocked state of the locking washer.

According to one embodiment, the nut comprises an outer surface with at least one longitudinal channel and the circumference of the locking washer comprises at least one spur which is able to adopt a non-folded position in which the spur does not interfere with a longitudinal channel of the nut and allows the nut to move in rotation, and a folded position in which the spur is housed in a longitudinal channel of the nut and prevents said nut from rotating.

The locking washer preferably comprises an orifice having shapes which are complementary with those of the extension of the second sleeve so as to allow the locking washer to move in translation on the extension and to prevent the locking washer from rotating with respect to the extension in the locked state of the locking washer.

According to one embodiment, the extension comprises an outer surface with at least one longitudinal channel and the locking washer comprises at least one spur which is able to be housed in a longitudinal channel of the extension.

Advantageously, the assembly comprises at least one compensation washer interposed between the locking washer and the second arm of the clevis.

Advantageously, the articulation spindle comprises a central part, a second portion at its second end which is separated from the central part by a shoulder which is able to bear against the inner shoulder of the nut, the articulation spindle further comprising at least one through hole for receiving the longilinear element.

According to one embodiment, the through hole extends along a diameter of the articulation spindle and has an oblong cross section. The nut comprises at least one pair of orifices arranged in a transverse plane, the orifices of each pair being aligned along a diameter of the nut.

Advantageously, the articulation spindle comprises a central part, a first portion at its first end, the first portion and the inner shoulder of the first sleeve having complementary shapes so as to prevent the articulation spindle from rotating with respect to the first sleeve when the first portion is introduced into the inner shoulder.

BRIEF DESCRIPTION OF THE DRAWINGS

Other characteristics and advantages will emerge from the ensuing description of the invention, description given solely by way of example, with regard to the appended drawings in which.

DETAILED DESCRIPTION OF THE PREFERRED EMBODIMENTS

Figure 4:
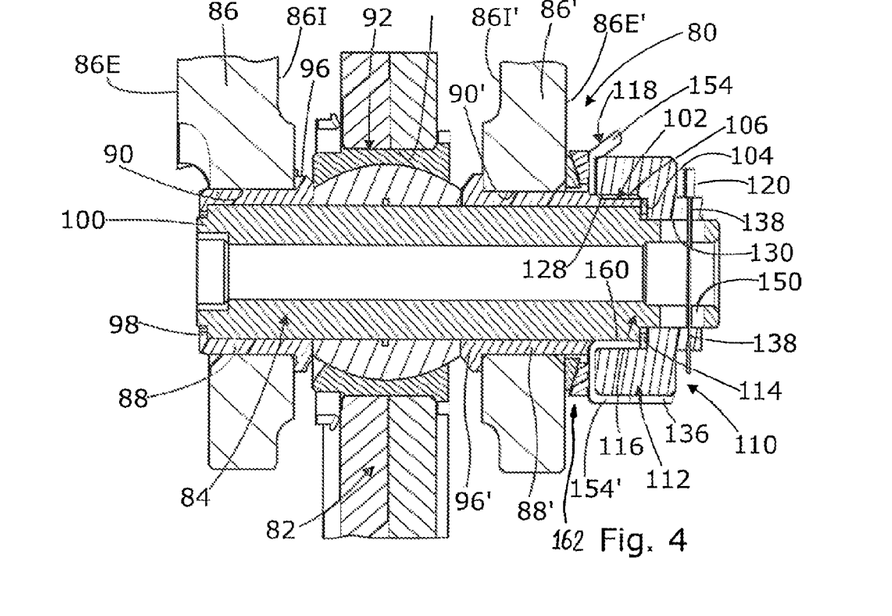
FIG. 4 is a section through an assembly having an articulation spindle which illustrates an embodiment of the invention.

FIG. 4 shows an assembly connecting an attachment pylon and an engine of an aircraft.

This assembly comprises a clevis 80 secured to the attachment pylon, a ferrule 82 secured to the engine and an articulation spindle 84 connecting the clevis 80 and the ferrule 82.

Of course, the invention is not limited to this application. It may be used for the other fasteners between the wing/the attachment pylon and the attachment pylon/the engine.

The clevis 80 comprises a first arm 86 and a second arm 86', each comprising an inner face 86I, 86I' and an outer face 86E, 86E', wherein the inner faces 86I and 86I' face each other.

The assembly comprises a first sleeve 88 supported by the first arm 86 and a second sleeve 88' supported by the second arm 86', the first and second sleeves 88, 88' being coaxial and aligned and having substantially equal internal diameters.

In the rest of the description, the longitudinal direction corresponds to the direction of the axes of the sleeves 88, 88'. A transverse plane is perpendicular to the longitudinal direction.

According to one embodiment, the first arm 86 comprises a first through hole 90 which opens at the inner face 86I and outer face 86E of said first arm and into which is inserted the first sleeve 88. In parallel, the second arm 86' comprises a second through hole 90' which opens at the inner face 86I' and outer face 86E' of said second arm 86 and into which is inserted the second sleeve 88'. The outer diameter of the first sleeve 88 is substantially greater than the diameter of the first through hole 90, making an interference fit possible. The outer diameter of the second sleeve 88' is substantially greater than the diameter of the second through hole 90', making an interference fit possible. By virtue of the interference fits, the sleeves 88, 88' are fixed with respect to the arms 86, 86'.

The ferrule 82 comprises a bearing 92 with a cylindrical bearing surface whose diameter is substantially equal to the internal diameters of the sleeves 88, 88'. The bearing 92 is preferably a swivel bearing.

The articulation spindle 84 comprises a solid or hollow cylindrical body whose outer diameter is substantially equal to the internal diameters of the sleeves 88, 88' and the diameter of the cylindrical bearing surface of the bearing of the ferrule.

The first sleeve 88 of the first arm 86 comprises at a first end an outer shoulder 96 which projects out from the first sleeve and which bears against the inner face 86I of the first arm 86 and at a second end an inner shoulder 98 which projects into the sleeve and which acts as a stop against which a first end 100 of the articulation spindle 84 can come to bear when it is installed.

The second sleeve 88' of the second arm 86' comprises at a first end an outer shoulder 96' which projects out from the second sleeve and which bears against the inner face 86I' of the second arm 86' and at a second end an extension 102 in the form of a hollow cylinder which extends beyond the outer face 86E' of the second arm 86' and which ends in a circumferential rim 104 arranged in a transverse plane.

The outer diameter of this extension 102 is substantially equal to or slightly smaller than the outer diameter of the rest of the second sleeve 88'.

The extension 102 comprises an internal diameter which is substantially equal to the internal diameter of the rest of the second sleeve 88'.

The extension 102 comprises at least one threaded portion 106 on its outer surface. Preferably, this threaded portion 106 extends over the entire length of the extension 102.

The articulation spindle 84 is immobilized in translation in the longitudinal direction by means of:
the inner shoulder 98 of the first sleeve 88 which limits the movement of the articulation spindle 84 in the sleeves 88, 88', in the sense of introduction (labeled 108 in FIG. 5), and
a blocking device 110 which limits the movement of the articulation spindle 84 in the sense of withdrawing said articulation spindle.

According to one embodiment of the invention, the blocking device 110 comprises:
a nut 112 which is screwed onto the threaded portion 106 of the extension 102 and which comprises an inner shoulder 114 against which a second end 116 of the articulation spindle can come to bear,
a locking washer 118 which is able to adopt a locked state in which it prevents the nut 112 from rotating with respect to the extension 102 and an unlocked state in which it allows the nut 112 to be unscrewed,
a longilinear element 120 which is able to adopt a locked state in which it passes through at least the nut 112 so as to prevent it from rotating and an unlocked state in which it allows the nut 112 to be unscrewed.

According to one embodiment, the nut 112 comprises an approximately cylindrical body which extends from a front face 122, oriented toward the second arm 86' of the clevis, to a rear face 124.

The nut 112 comprises a through passage 126 which extends between the front face 122 and the rear face 124 and which comprises:
a first tapped portion 128 which extends from the front face 122 and whose diameter and pitch match those of the threaded portion 106 of the extension 102,
a second, smooth portion 130 which extends from said first portion 128 to the rear face 124, said second portion 130 having a smaller diameter than the first portion 128.

Given this difference in diameters, the first portion 128 and the second portion 130 are separated by a surface which extends in a transverse plane and which forms the inner shoulder 114.

The nut 112 comprises an outer surface whose shapes are adapted so as to allow the nut to be screwed on. This outer surface is accessible and ensures simple, tool-free installation of the nut 112.

According to one embodiment, the outer surface comprises a first portion 132 which extends from the front face 122 and a second portion 134 which has a smaller diameter than the first portion 132 and which extends from the first portion 132 to the rear face 124.

The first portion 132 comprises at least one longitudinal channel 136 which extends in the longitudinal direction. For preference, the first portion 132 is fluted and comprises multiple longitudinal channels 136 evenly distributed over the circumference of the nut 112. By way of example, the nut 112 comprises six longitudinal channels 136.

The second portion 134 is preferably smooth and comprises at least one pair of orifices 138 which are aligned with and intersect the through passage 126, and whose diameters are equal, give or take the functional clearances, to the external diameter of the longilinear element 120. According to one embodiment, the orifices 138 are arranged in a transverse plane, the orifices of each pair being aligned along a diameter of the nut 112.

According to a first variant which is not shown, the longilinear element 120 passes through the extension 102 and makes it possible to prevent the nut 112 from rotating with respect to the extension 102.

According to a second variant which is shown in the various figures, the longilinear element 120 passes through the articulation spindle 84 and makes it possible to prevent the nut 112 from rotating with respect to the articulation spindle 84.

According to this variant, the articulation spindle 84 comprises a cylindrical central part with an external diameter which is substantially equal to those of the sleeves 88, 88' and of the bearing 92, a first portion 140 with a cross section smaller than the central part provided at the first end 100 of the articulation spindle and a second portion 142 with a cross section smaller than the central part provided at the second end 116 of the articulation spindle.

Figure 7A:
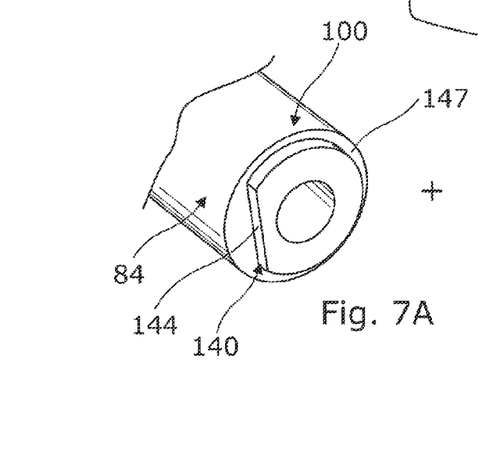
FIG. 7A is a perspective view showing in detail a first end of an articulation spindle according to one variant of the invention.
Figure 7B:
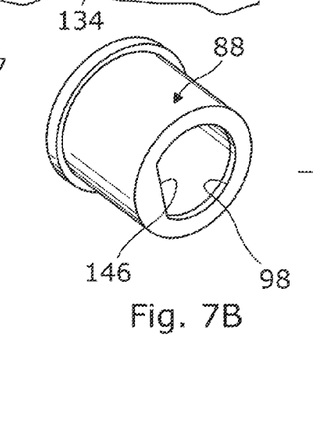
FIG. 7B is a perspective view showing in detail a first sleeve according to one variant of the invention.
Figure 7C:
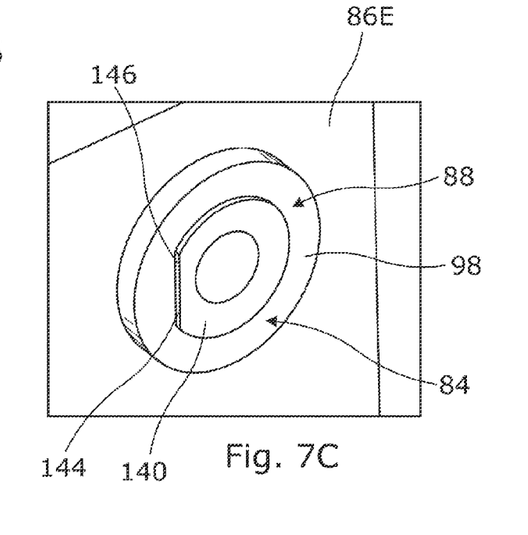
FIG. 7C is a perspective view showing the articulation spindle shown in FIG. 7A mounted in the sleeve shown in FIG. 7B

As shown in FIGS. 7A to 7C, the first portion 140 and the inner shoulder 98 of the first sleeve 88 have complementary shapes so as to prevent the articulation spindle 84 from rotating with respect to the first sleeve 88 when the first portion 140 is introduced into the inner shoulder 98 as shown in FIG. 7C. According to one embodiment shown in detail in FIG. 7A, the first portion 140 of the articulation spindle comprises at least one flattened portion 144. In addition, the inner shoulder 98 of the first sleeve 88 comprises at least one flattened portion 146. Other solutions for preventing the articulation spindle 84 from rotating can of course be envisaged.

The first portion 140 of the articulation spindle is separated from the central part by a surface arranged in a transverse plane which forms a shoulder 147 which is able to bear against the inner shoulder 98 of the first sleeve 88.

The diameter of the second portion 142 of the articulation spindle is smaller than that of the second portion 130 of the through hole 126. The second portion 142 of the articulation spindle is separated from the central part by a surface arranged in a transverse plane which forms a shoulder 148 which is able to bear against the inner shoulder 114 of the nut 112.

The second portion 142 of the articulation spindle comprises at least one through hole 150 for housing the longilinear element 120. For preference, this through hole 150 extends along a diameter of the articulation spindle and has an oblong cross section in order to facilitate the installation of the longilinear element 120.

The locking washer 118 extends in a transverse plane.

The locking washer 118 comprises a circumference 152 with shapes which are complementary with those of the nut 112 and which, in a first position corresponding to the locked state of the locking washer 118, prevent the nut 112 from rotating and, in a second position corresponding to the unlocked state of the locking washer 118, allow the nut 112 to rotate.

According to one embodiment, the locking washer 118 comprises at least one spur 154 which projects with respect to the circumference 152. Each spur 154 is delimited by a U-shaped perimeter. The locking washer 118 preferably comprises multiple spurs 154 evenly distributed over the circumference. This solution allows the blocking position of the nut 112 to be refined.

As shown in the upper part of FIG. 4, a spur 154 may adopt a non-folded position in which it does not interfere with a longitudinal channel 136 of the nut 112 and allows the nut 112 to move in rotation, which corresponds to the unlocked state of the locking washer 118. As shown in the lower part of FIG. 4, a spur 154' may adopt a folded position in which it is housed in a longitudinal channel 136 of the nut 112 and prevents said nut 112 from rotating, which corresponds to the locked state of the locking washer 118.

The locking washer 118 comprises an orifice 156 whose diameter is slightly greater than that of the extension 102 so as to allow said locking washer to be positioned about the extension 102, interposed between the nut 112 and the outer face 86E' of the second arm 86' of the clevis 80.

The orifice 156 comprises shapes which are complementary with those of the extension 102 of the second sleeve 88' so as to allow the locking washer 118 to move in translation on the extension 102 and to prevent the locking washer 118 from rotating with respect to the extension 102 in the locked state of the locking washer 118.

According to one embodiment, the extension 102 comprises, on its outer surface, at least one longitudinal channel 158 which opens at the rim 104 of the extension 102.

In addition, the locking washer 118 comprises at least one spur 160 which extends from the rim of the orifice 156 whose dimensions and shapes are adapted to allow the spur 160 to be housed in the longitudinal channel 158 provided on the extension 102. According to one embodiment, the spur 160 has a U-shaped perimeter and extends in the longitudinal direction so as to form an angle of approximately 90° with respect to the locking washer 118.

For preference, the assembly comprises at least one compensation washer 162 which is interposed between the locking washer 118 and the outer face 86' of the second arm 86' of the clevis 80 so as to compensate for the clearances and hold the locking washer 118 against the front face 122 of the nut 112.

According to one embodiment, the longilinear element 120 takes the form of a flexible element such as a cable or a collar.

According to another embodiment, the longilinear element 120 takes the form of a rigid element such as a pin.

Figure 5:
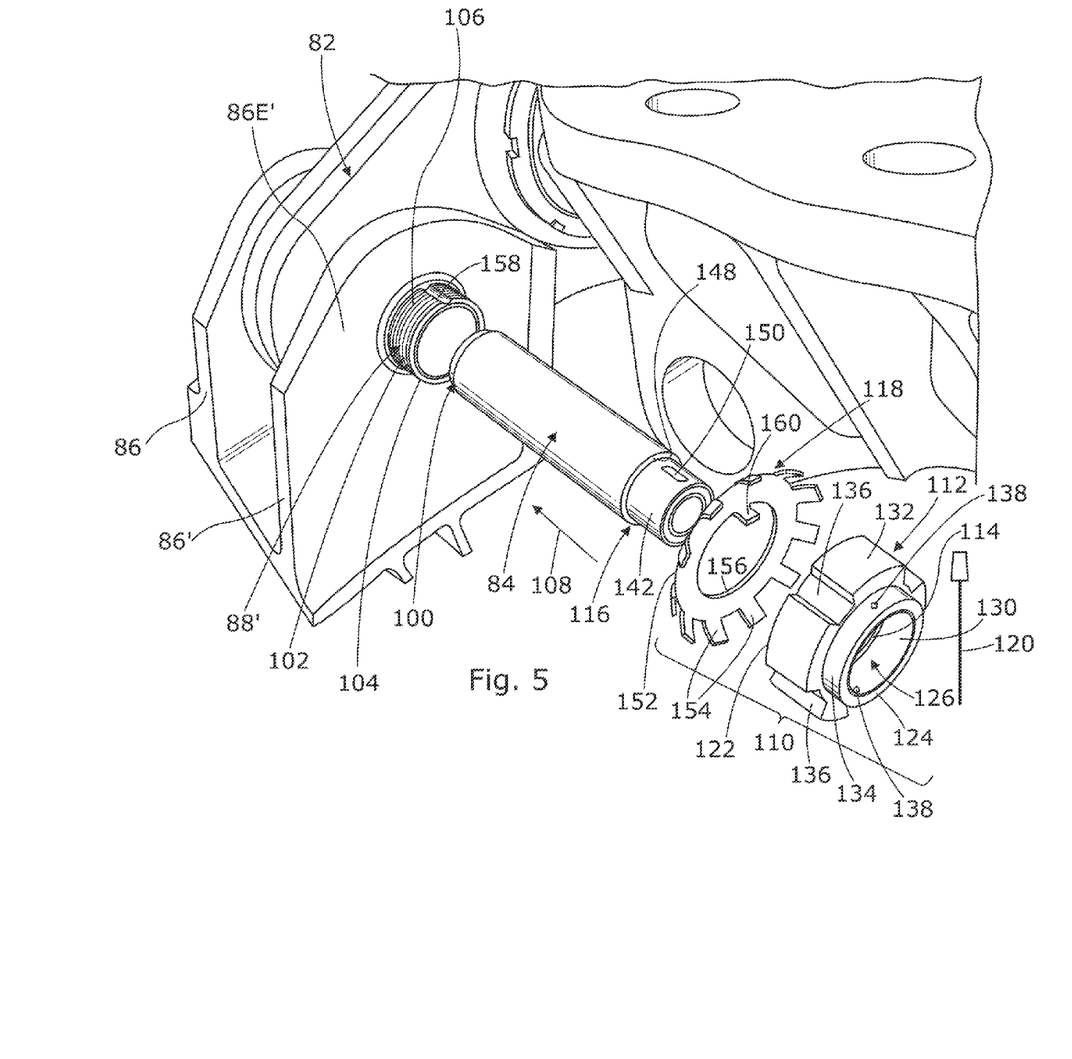
FIG. 5 is a perspective view of the assembly shown in FIG. 4, during assembly.
Figure 6:
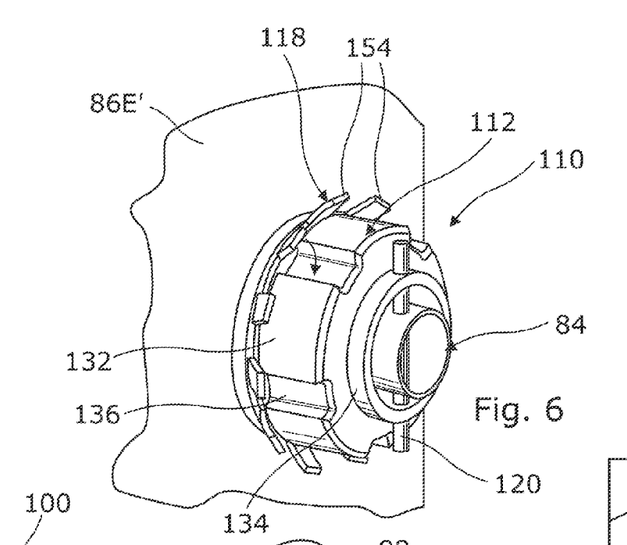
FIG. 6 is a perspective view of one portion of the assembly shown in FIG. 4, in the installed state.

In order to produce the assembly, the sleeves 88, 88' are inserted into the arms 86, 86' of the clevis 80 from the inside of the arms. The ferrule 82 is then introduced between the arms 86, 86' until the axis of the bearing 92 of the ferrule 82 is aligned with the axes of the sleeves 88, 88'. The articulation spindle 84 is introduced into the sleeves 88, 88' and the bearing 92 from a first side of the clevis 80, causing the flattened portions 144 and 146 of the articulation spindle 84 and of the sleeve 88 to engage, until the shoulder 147 of the articulation spindle comes to bear against the inner shoulder 98 of the first sleeve 88. Then, the compensation washer(s) 162 and the locking washer 118 are push-fitted onto the extension 102, causing the spur 160 of the locking washer 118 to engage with the longitudinal channel 158 of the extension 102. The nut 112 is then screwed onto the extension 102 until only a small clearance remains between the inner shoulder 114 of the nut and the shoulder 148 of the articulation spindle. One of the spurs 154' of the locking washer 118 is folded into a longitudinal channel 136 of the nut 112 so as to prevent it from rotating. Then, the longilinear element 120 is installed so as to prevent the nut 112 from rotating with respect to the articulation spindle 84 which is itself prevented from rotating with respect to the first sleeve 88.

According to the invention, the locking washer 118 acts as a first anti-rotation system. The longilinear element 120 and the complementary shapes between the articulation spindle 84 and the first sleeve 88 act as a second anti-rotation system.

The advantages of the assembly according to the invention are as follows:

this assembly makes it possible to introduce the articulation spindle and to block it in translation from just one side of the clevis. It is thus possible to arrange the devises of the engine/attachment pylon fasteners so as to allow introduction from one side of the nacelle in the case of a nacelle configuration having a small ground clearance;

this assembly makes it possible to simplify the installation of the blocking device with a double anti-rotation system and to limit the use of tools;

this assembly requires no modification to the clevis or the ferrule.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An assembly comprising:
    an articulation spindle mounted in a first sleeve inserted into a first arm of a clevis and in a second sleeve inserted into a second arm of said clevis, said first sleeve comprising an inner shoulder which projects into said first sleeve and which acts as a stop for a first end of said articulation spindle,
    a blocking device acting as a stop for a second end of said articulation spindle, the blocking device comprising:
        a nut screwed onto a threaded portion of an extension of the second sleeve and comprising an inner shoulder acting as a stop for the second end of the articulation spindle,
        a locking washer able to adopt a locked state to prevent the nut from rotating with respect to the extension and an unlocked state to allow the nut to be unscrewed,
        a longilinear element able to adopt a locked state in which the longilinear element passes through at least the nut and the articulation spindle so as to prevent the nut from rotating with respect to the articulation spindle and an unlocked state in which the longilinear element allows the nut to be unscrewed from the threaded portion of the extension, and,
    wherein the articulation spindle further comprises at least one through hole for receiving the longilinear element.

2. The assembly as claimed in claim 1, wherein the locking washer comprises a circumference comprising a shape complementary with that of the nut, the complementary shape preventing the nut from rotating with respect to the extension in a first position corresponding to the locked state of the locking washer, and allowing the nut to rotate with respect to the extension in a second position, corresponding to the unlocked state of the locking washer.

3. The assembly as claimed in claim 2, wherein the nut comprises an outer surface with at least one longitudinal channel and wherein the circumference of the locking washer comprises at least one spur which is able to adopt a non-folded position in which the spur does not interfere with a longitudinal channel of the nut and allows the nut to move in rotation, and a folded position in which the spur is housed in a longitudinal channel of the nut and prevents said nut from rotating.

4. The assembly as claimed in claim 1, wherein the locking washer comprises an orifice having a shape which is complementary with that of the extension of the second sleeve so as to allow the locking washer to move in translation on the extension and to prevent the locking washer from rotating with respect to the extension in the locked state of the locking washer.

5. The assembly as claimed in claim 4, wherein the extension comprises an outer surface with at least one longitudinal channel and wherein the locking washer comprises at least one spur configured to be housed in a longitudinal channel of the extension.

6. The assembly as claimed in claim 1, further comprising at least one compensation washer interposed between the locking washer and the second arm of the clevis.

7. An assembly comprising:
    an articulation spindle mounted in a first sleeve inserted into a first arm of a clevis and in a second sleeve inserted into a second arm of said clevis, said first sleeve comprising an inner shoulder which projects into said first sleeve and which acts as a stop for a first end of said articulation spindle,
    a blocking device acting as a stop for a second end of said articulation spindle, the blocking device comprising:
        a nut screwed onto a threaded portion of an extension of the second sleeve and comprising an inner shoulder acting as a stop for the second end of the articulation spindle,
        a locking washer able to adopt a locked state to prevent the nut from rotating with respect to the extension and an unlocked state to allow the nut to be unscrewed,
        a longilinear element able to adopt a locked state in which the longilinear element passes through at least the nut and the articulation spindle so as to prevent the nut from rotating with respect to the articulation spindle and an unlocked state in which the longilinear element allows the nut to be unscrewed from the threaded portion of the extension, and,
    wherein the locking washer comprises an orifice having a shape which is complementary with that of the extension of the second sleeve so as to allow the locking washer to move in translation on the extension and to prevent the locking washer from rotating with respect to the extension in the locked state of the locking washer, and,
    wherein the extension comprises an outer surface with at least one longitudinal channel and wherein the locking washer comprises at least one spur configured to be housed in a longitudinal channel of the extension.

8. The assembly as claimed in claim 7, wherein the locking washer comprises a circumference comprising a shape complementary with that of the nut, the complementary shape preventing the nut from rotating with respect to the extension in a first position corresponding to the locked state of the locking washer, and allowing the nut to rotate with respect to the extension in a second position, corresponding to the unlocked state of the locking washer.

9. The assembly as claimed in claim 8, wherein the nut comprises an outer surface with at least one longitudinal channel and wherein the circumference of the locking washer comprises at least one spur which is able to adopt a non-folded position in which the spur does not interfere with a longitudinal channel of the nut and allows the nut to move in rotation, and a folded position in which the spur is housed in a longitudinal channel of the nut and prevents said nut from rotating.

10. The assembly as claimed in claim 7, further comprising at least one compensation washer interposed between the locking washer and the second arm of the clevis.

11. An assembly comprising:
an articulation spindle mounted in a first sleeve inserted into a first arm of a clevis and in a second sleeve inserted into a second arm of said clevis, said first sleeve comprising an inner shoulder which projects into said first sleeve and which acts as a stop for a first end of said articulation spindle,
a blocking device acting as a stop for a second end of said articulation spindle, the blocking device comprising:
   a nut screwed onto a threaded portion of an extension of the second sleeve and comprising an inner shoulder acting as a stop for the second end of the articulation spindle,
   a locking washer able to adopt a locked state to prevent the nut from rotating with respect to the extension and an unlocked state to allow the nut to be unscrewed,
a longilinear element able to adopt a locked state in which the longilinear element passes through at least the nut and the articulation spindle so as to prevent the nut from rotating with respect to the articulation spindle and an unlocked state in which the longilinear element allows the nut to be unscrewed from the threaded portion of the extension,
wherein the articulation spindle comprises a central part, a second portion at its second end which is separated from the central part by a shoulder which is able to bear against the inner shoulder of the nut, the articulation spindle further comprising at least one through hole for receiving the longilinear element.

12. The assembly as claimed in claim, 11 wherein the through hole extends along a diameter of the articulation spindle and has an oblong cross section.

13. The assembly as claimed in claim 12, wherein the nut comprises at least one pair of orifices arranged in a transverse plane, the orifices of each pair being aligned along a diameter of the nut.

14. The assembly as claimed in claim 13, wherein the articulation spindle comprises a central part, a first portion at its first end, the first portion and the inner shoulder of the first sleeve having complementary shapes so as to prevent the articulation spindle from rotating with respect to the first sleeve when the first portion is introduced into the inner shoulder.

15. The assembly as claimed in claim 12, wherein the articulation spindle comprises a central part, a first portion at its first end, the first portion and the inner shoulder of the first sleeve having complementary shapes so as to prevent the articulation spindle from rotating with respect to the first sleeve when the first portion is introduced into the inner shoulder.

16. The assembly as claimed in claim 11, wherein the articulation spindle comprises a central part, a first portion at its first end, the first portion and the inner shoulder of the first sleeve having complementary shapes so as to prevent the articulation spindle from rotating with respect to the first sleeve when the first portion is introduced into the inner shoulder.

17. The assembly as claimed in claim 11, wherein the locking washer comprises a circumference comprising a shape complementary with that of the nut, the complementary shape preventing the nut from rotating with respect to the extension in a first position corresponding to the locked state of the locking washer, and allowing the nut to rotate with respect to the extension in a second position, corresponding to the unlocked state of the locking washer.

18. The assembly as claimed in claim 11, wherein the nut comprises an outer surface with at least one longitudinal channel and wherein the circumference of the locking washer comprises at least one spur which is able to adopt a non-folded position in which the spur does not interfere with a longitudinal channel of the nut and allows the nut to move in rotation, and a folded position in which the spur is housed in a longitudinal channel of the nut and prevents said nut from rotating.

* * * * *